Feb. 18, 1947. W. R. HARDING ET AL 2,416,175
SERIES GENERATOR AND MOTOR DRIVE CONTROL SCHEME
Filed May 11, 1944 2 Sheets-Sheet 1
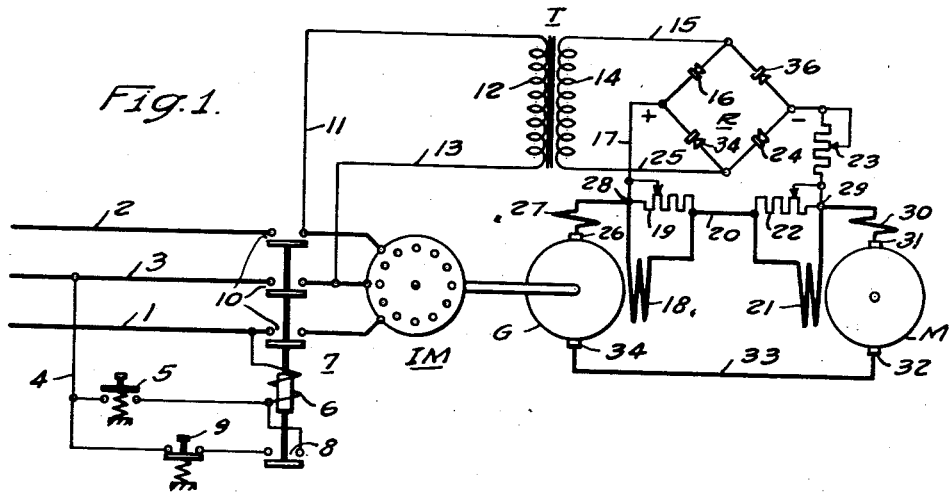
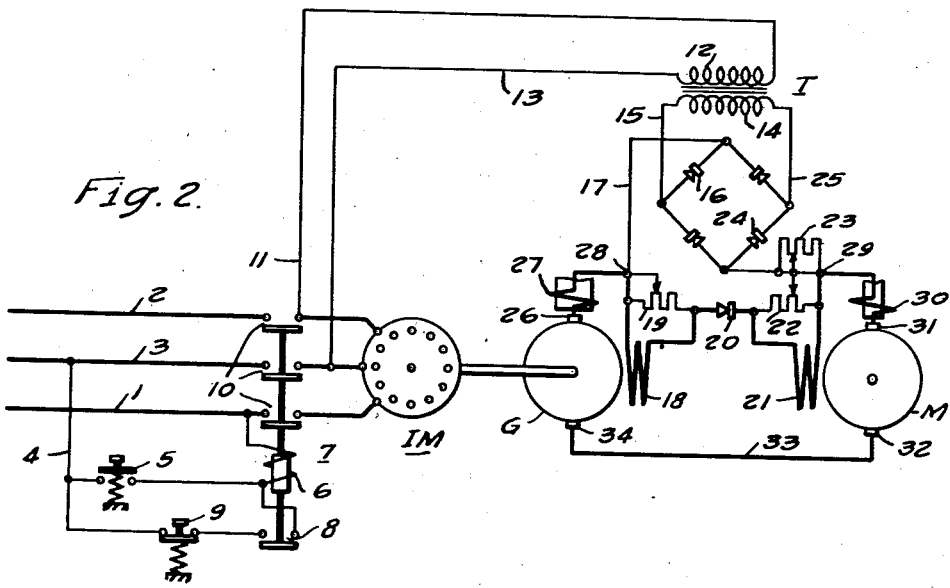
WITNESSES:
INVENTORS
William R. Harding
and Raymond W. Moore.
BY
Paul E. Friedemann
ATTORNEY Feb. 18, 1947.  W. R. HARDING ET AL  2,416,175
SERIES GENERATOR AND MOTOR DRIVE CONTROL SCHEME
Filed May 11, 1944  2 Sheets-Sheet 2
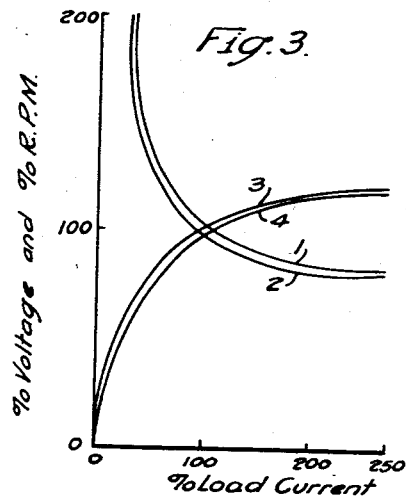
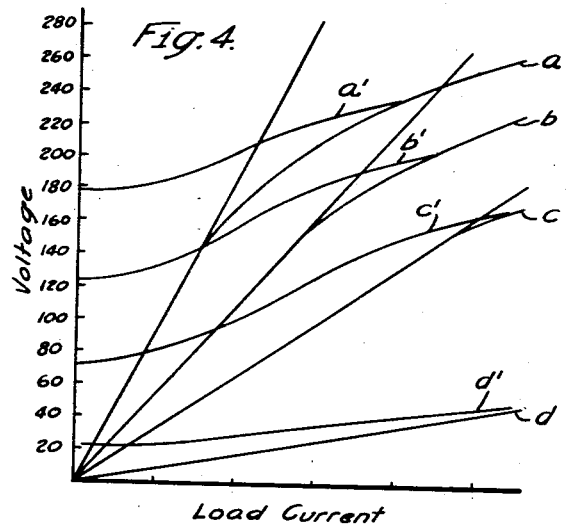
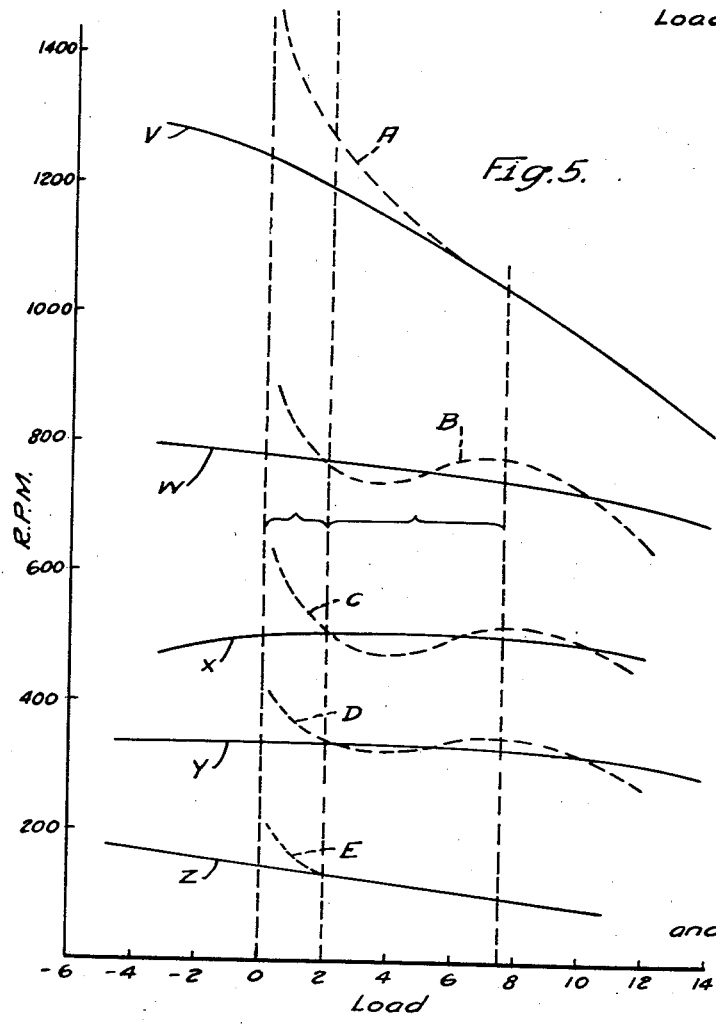
INVENTORS
William R. Harding
and Raymond W. Moore.
BY Paul E. Friedemann
ATTORNEY Patented Feb. 18, 1947

2,416,175

UNITED STATES PATENT OFFICE 2,416,175

SERIES GENERATOR AND MOTOR DRIVE CONTROL SCHEME

William R. Harding, Export, and Raymond W. Moore, Edgewood, Pa., assignors to Westinghouse Electric Corporation, East Pittsburgh, Pa., a corporation of Pennsylvania Application May 11, 1944, Serial No. 535,108

14 Claims. (Cl. 172—239)

Our invention relates to adjustable speed drives and, more particularly, to a variable voltage generator and motor drive in which the generator is a series generator and the motor is also of the series type having the same frame size and thus a rating substantially equal to that of the generator.

Series motors are, of course, in regular use and well known to the trade, but series generators for the purpose of driving motors have always been held very unsatisfactory. For instance, as one of their disadvantages such generators have a rising voltage characteristic with an increase in load current. This is usually very unsatisfactory. We, however, have found that by selecting the proper values for the constants of both the generator and the motor, the motor speed may be kept substantially constant for any speed setting selected, regardless of the variations in load.

While the proper selections of the mechanical and particularly the electrical characteristics of a series generator and series motor combination can go a long way toward the provision of an effective and useful variable speed drive for, say, machine tools as grinders, there are still many applications of this drive where the speed characteristics show instability for certain ranges of load currents of the motor.

One broad object of our invention is the provision of a variable speed series drive having stable operation at all loads placed on the series motor.

A more specific object of our invention is the provision of auxiliary excitation for the dynamo-electric machines of a series drive to provide stable speeds at all loads and all speeds selected for the drive.

Another object of our invention is the provision of effective dynamic braking of a series motor in a series drive including a series generator for electrically operating a series motor of the same design and capacity as the series generator.

Another object of our invention is to provide a stable high torque operation of a series motor energized from a series generator of generally somewhat the same design characteristics as the series motor.

A still further object of our invention, as hereinafter disclosed, is the provision of good and stable speed regulation at light loads.

The objects hereinbefore expressed are believed to be merely illustrative and many other objects and advantages will become more apparent from a study of the following specification, when considered with the drawings accompanying this specification, and in which drawings:

Figure 1 is a diagrammatic showing of our invention;

Fig. 2 is a diagrammatic showing of a modification of our invention;

Figs. 3, 4 and 5 show a plurality of curves helpful in illustrating some of the characteristics of our series drive.

In Fig. 1, we show a constant speed induction motor IM for driving a series generator G, which generator G is electrically connected in a loop circuit with the series motor M for driving a suitable load mechanically coupled to the motor. These two machines, the generator and the motor, are dynamo-electric machines, preferably of the same frame size and thus of comparable rating and are otherwise substantially exactly alike in structure.

In Fig. 3, curves 1 and 2 show a speed load curve of a conventional series motor having normal residual as compared to a series motor of the type used by us wherein the residual flux of the motor is very materially less than for a conventional series motor. Curves 3 and 4 in Fig. 3 show the saturation curves of a series generator of conventional design having relatively high residual flux compared to a series generator of the type we use wherein the residual flux is very materially reduced. The machines we use, as disclosed in this application, may, of course, include all of the improvements and refinements disclosed and claimed in the patent to W. R. Harding et al. No. 2,303,457, issued December 1, 1942, entitled "Series speed-control units" and also the refinements and improvements disclosed and claimed in the patent of W. R. Harding et al. No. 2,363,320, issued November 21, 1944, and entitled "Series variable speed drives."

To improve the speed regulation, particularly at light loads, our theoretical considerations show that this could be accomplished if machines could be had that show no or zero hysteresis losses and yet were able to build up fluxes to produce voltage and torque. Dynamo-electric machines having no hysteresis losses are neither as now known possible nor desirable, because such machines could not build up flux. However, we have obtained very material improvements with existing materials by providing the machines with low residual flux with reference to the no load saturation flux of the machine. In conventional machines, the residual flux may be from 20% to 12% of the no load saturation flux, the 12% being probably the very lowest that may be found occasionally with conventional machines. For our particular application, we provide the dynamo-electric machines of the series generator and the series motor with a type of magnetic circuit wherein the residual flux may vary from 15% to as low as 4% of the no load saturation flux. This advantage may be obtained as, for instance, with laminated rolled steel and Bessemer sheet steel or other irons and steels having desirable qualities or the magnetic structure may be annealed. In Fig. 3, it will be noted that the curve 4 cuts the ordinate at a much lower point, that is, at a point much nearer zero than the curve 3 which represents the magnetization curve of a conventional machine. Curve 4, on the other hand, represents the magnetization curve of our machine.

In Fig. 2, we show interpoles on the generator, thereby increasing the amount of iron in the interpoles or commutating poles. This increase in the amount of iron thus prevents the operation of the interpoles or commutating poles at saturation at the currents required to produce the desired high torques at increased loads, and particularly the desired higher torques at increased loads at low speeds. The stalled motor torque is thereby increased.

It is well known that the armature reaction distorts or shifts the current sheet, and thus not only normally impairs commutation if the brushes are not shifted, but in a series drive the armature reaction will distort the field sufficiently to cause a decrease in generator voltage. By the terms current sheet we mean the effective region on the surface of the brushes of a machine at which it may be considered that the entire current flow is concentrated. This is most serious at the lower speeds. At the lower speeds, the generator field, by operation of the rheostat 19 to a low speed position, is necessarily weakened, thereby making the generator field subject to further weakening due to the armature reaction. The voltage of the generator thus decreases with a rise in load, and the motor M thus stalls much more readily. With the interpoles we show the iron of the interpoles at no time during any practical operation becomes saturated, and the unsaturated commutating poles in the generator thus decrease the distortion effect of the armature current by preventing shifting of the current sheet. The voltage of the generator thus remains at the desired selected value, and the stalled motor torque is increased very considerably.

While, as already stated, the series drive for load applications such as grinders and other machine tools, has been a valuable contribution to the art, there have still been many applications where the series drive did not yet function for certain loads with the desired stability. In this connection, reference may be had to the curves shown in Fig. 5. In this figure, we compare the speed load curve of our series drive with the series drive heretofore used in the prior art. It should be noted that at the left ends of the curves A, B, C, D and E, the speed for the conventional series drive is considerably higher for the same load as is the speed for the curves V, W, X, Y, and Z. Further, it should be noted that the curves A, B, C, D and E have a much more nearly horizontal position than the curves V, W, X, Y and Z. Thus not only is the speed at the higher torques maintained, but the overall speed is maintained constant over a greater load range. This is of particular advantage for the low speeds as shown by the relation of curves C, D, E and X, Y, Z.

The main and valuable contribution we make to the series drive is, however, the improved stability we obtain with the particular method of excitation we provide for both the series generator and the series motor. To better understand the advantages and objects of our invention, we shall first discuss a typical sequence of operation.

Assuming that the motor M, see Fig. 1, is coupled to a suitable load and the attendant wishes to operate this load, he thereupon actuates starting push button 5 whereupon a circuit is established from the bus 3 through conductor 4, starting push button 5, actuating coil 6 of the line contactor 7 to the bus 1. Buses 1, 2 and 3 are connected to a suitable source of alternating current usually available in industry.

Operation of the line contactor 7 closes the contact members 8 whereupon this line contactor is held in by means of the circuit established through the stop switch 9 and contact members 8. The line contactor also closes contact member 10 to energize the constant speed induction motor IM for driving the generator G. Both the generator and the motor M are provided respectively with the series field windings 18 and 21. These series field windings are provided respectively with parallelly connected adjustable impedances 19 and 22 for controlling the excitation of the field windings. The particular adjustment of the impedances 19 and 22 will determine the speed of operation of the motor M. The motor M and generator G are connected in a looped circuit, which circuit may be traced from the armature terminal 26 of the generator through the commutating field winding 27, junction 28, field winding 18, connected in parallel to the adjustable impedance 9, conductor or junction 20, field winding 21, connected in parallel to the adjustable impedance 22, junction 29, commutating field 30 of the motor M, the armature of the motor M represented by the armature terminals 31 and 32, conductor 33, armature terminal 34 of the generator G back to the armature terminal 26.

So far as this circuit thus far traced is concerned, it is exactly as heretofore known and used for this type of series drive. However, to improve stability, we provide auxiliary direct-current excitation for the generator field winding 18 and the motor field winding 21. This auxiliary direct-current excitation is supplied from the full-wave rectifier R.

When the line contactor 7 operated, a circuit was also established from the energized conductor 11 through the primary 12 of the transformer T to the energized conductor 13. The secondary winding 14 thus being energized supplies alternating current for one-half cycle through the conductor 15, rectifier unit 16, conductor 17 to junction 28, the excitation circuit for both the generator and the motor, the junction 29, adjustable impedance 23, rectifier unit 24, and conductor 25 to the secondary of the transformer 14. For the second half of the cycle, conductor 25 may be considered as positive whereupon rectifier unit 35 passes current to the conductor 17 and rectifier unit 36 returns the unit to the conductor 15 and thus back to the transformer secondary. It will thus be apparent that not only are the series field windings for the generator as well as the motor energized with load current, but an auxiliary direct-current excitation is provided for these field windings, that is, for the excitation circuit.

This auxiliary source of direct-current excitation produces a stabilizing effect for the excitation of the generator as well as of the motor. The operation of this stabilizing effect is as follows: Referring to Fig. 5, it will be noted that the curves B, C and D of a standard series drive show two points of curvature, one at the region $a$ and one at the region $b$. The curvature, that is, the upward swing towards the left of these curves which means an increase in speed with a decrease in load is due to the external series characteristics of the motor predominating at very light loads so that the speed tends to rise very rapidly even though the generator at this stage of operation generates a low voltage, that is, provides the motor with a very low voltage. With the auxiliary source of excitation from the full-wave rectifier R, such unwanted series characteristics at the light loads are eliminated as the motor always has some definite and considerable excitation, particularly at light loads. When we say "considerable excitation," we mean in a relative sense since at the light loads, the auxiliary excitation predominates. As a matter of fact, the preferred arrangement is such that the auxiliary source of excitation is not effective at all when the motor is operated at full load, but is only effective to produce an added excitation in the excitation circuit when the load varies from full load.

The reason for the inverse curvature, that is, the shape of the curve for the series drive at the region $b$, is that the motor on the standard series variable voltage drive as known in the prior art has an excitation which varies from very low excitation to full excitation from no load to full load. During this period, the motor flux when the motor is unsaturated, varies directly with load, but after reaching the point of saturation, it varies less than directly with load amperes. This can be seen from the curves in Fig. 4. So long as the generator is at full field, it varies over the same range as the motor current and no instability exists, but at the lower speeds, the generator operation may vary over the unsaturated range only. For such a condition, the motor and generator react equally with load up to the point of saturation in the motor. However, beyond this point, the motor flux does not increase as rapidly with load as the generator voltage. Therefore, the motor speed increases with load until the resistance of the circuit causes the motor speed to drop or the generator also begins to saturate. By using the rectifier R and suitably selecting the characteristics of the controlled circuit providing the auxiliary excitation, the motor is always excited at some value of excitation beyond the point of saturation. It will be noted by referring to curve $a'$ in Fig. 4 that the motor (assuming that the motor is an exact duplicate of the generator in design and characteristics which is the aim as a rule for this type of drive), the motor always follows curve $a'$ when provided with the auxiliary excitation. Therefore, from no load to full load, the motor does not correct from an unsaturated condition to a saturated condition. The curvature in region $b$, which is particularly pronounced in curves B, C and D, is thus eliminated. The showing in Fig. 5 is taken from actual test curves and thus do not represent calculated curves. Theoretically, all calculated curves should, of course, provide the same results as test curves, but it is, as a rule, not possible to know all the factors that enter into a given solution to provide calculated curves during the design of electrical equipment which then the electrical equipment will exactly reproduce when being subjected to test.

In actual operation, the auxiliary source of excitation varies somewhat inversely to the excitation provided by the load current. For instance, if at very light loads the generator field current be one ampere, then current provided for the excitation circuit by the auxiliary source may be 5 amperes. However, as the load current on the generator increases, the excitation current from the auxiliary source decreases in substantially equal proportion so that at full load on the generator, the full-wave rectifier may not supply any current. This means that the size of the rectifier required is very much less than for a separately excited shunt or compound wound machine of the same size while the characteristics obtained are most desirable, as may be seen from curves V, W, X, Y and Z. Further, since the design is such that the rectifier does not supply excitation at full load, the average excitation supplied by the rectifier is relatively low. Further, at light loads the operation of the system is stabilized since the generator is operated at higher voltage.

For the modification shown in Fig. 2, we have shown the same reference characters for elements that are common to Figs. 1 and 2. It will be noted that the only difference between the showing in Fig. 1 and Fig. 2 is that in lieu of the conductor 20, we have provided the electric valve 20'. This electric valve 20' is so connected that current can flow only from left to right in the excitation circuit, that is, from the junction 28 toward the junction 29. This is of tremendous advantage when the operation of the system requires frequent stopping and dynamic braking is desired. During the stopping period, it will be noted that the rectifier still continues to provide the necessary excitation for the field windings 18 and 21, but that the dynamic braking current will flow readily from the motor M through the rectifier back to the generator G, but the dynamic braking current cannot flow from the junction 29 toward the junction 28 to decrease the excitation. Preventing a decrease in motor excitation is essential to aid in the braking operation for the motor M. Regenerative braking is thus obtained very successfully with our arrangement without the use of any additional contactors or expensive other equipment. The arrangement shown in Fig. 2 gives a very considerable braking effect.

We have shown the motor provided with the adjustable impedance 22 to obtain further speed control. The system is stable under this condition since at light loads the excitation of the motor and generator is mentioned at almost the same value as at full load. Therefore the speed of the motor at light loads is maintained within safe values with weakened field and a useful speed regulation is obtained for the motor.

While we have shown only two embodiments of our invention, we are aware that others, particularly after having had the benefit of the teaching of our invention, may devise still further circuits and other similar features. We, therefore, do not wish to be limited to the specific showing made but wish to be limited only by the scope of the claims hereto appended.

We claim as our invention:

1. In a motor drive circuit, in combination, a generator of the series type coupled to motor means to be driven from a source of supply at substantially constant speed, a motor of the series type connected in a loop circuit to the generator to be electrically driven thereby, a field for the generator, a field for the motor, an adjustable resistor shunting the field of the generator, said motor and generator being substantially alike in every respect as in the design and size, so as to have substantially like mechanical, magnetic and electrical characteristics, said generator field and its parallelly connected adjustable resistor and the field of the motor being connected in series in the loop circuit between corresponding armature terminals of the generator and motor, and a source of direct-current energy connected across the fields of the generator and motor to supply auxiliary excitation to the field windings of the motor and generator.

2. In a motor drive circuit, in combination, a generator of the series type coupled to motor means to be driven from a source of supply at substantially constant speed, a motor of the series type connected in a loop circuit to the generator to be electrically driven thereby, said motor and generator having magnetic circuits so treated that each machine has low residual flux relative to its normal no-load saturation flux, a field for the generator, a field for the motor, an adjustable resistor shunting the field of the generator, said motor and generator being substantially alike in every respect as in the design and size, so as to have substantially like mechanical, magnetic and electrical characteristics, said generator field and its parallelly connected adjustable resistor and the field of the motor being connected in series in the loop circuit between corresponding armature terminals of the generator and motor, and a source of direct-current energy connected across the fields of the generator and motor to supply auxiliary excitation of the field windings of the motor and generator, the voltage of said source of direct-current energy being so selected that substantially no excitation is being supplied to the field windings of the generator and motor at full load of the motor.

3. In a motor drive circuit, in combination, a generator of the series type coupled to motor means normally driving the generator at substantially constant speed, a motor of the series type connected in a loop circuit with the generator, excitation current controlling means for each of the field windings of the generator and motor, the field winding of the generator and its current controlling means having corresponding terminals connected to one terminal of the generator and having the other corresponding terminals connected to a junction, said field winding of the motor and and its excitation current controlling means having corresponding terminals connected to said junction and the other corresponding terminals connected to one motor terminal, a source of direct-current energy having its terminals connected respectively to the one terminal of the generator and to the one terminal of the motor.

4. In a motor drive circuit, in combination, a generator of the series type coupled to motor means normally driving the generator at substantially constant speed, a motor of the series type connected in a loop circuit to the generator, an adjustable resistor for each of the field windings of the generator and motor, the field winding of the generator and its adjustable resistor having corresponding terminals connected to one terminal of the generator and having the other corresponding terminals connected to a junction, said field winding of the motor and its adjustable resistor having corresponding terminals connected to said junction and the other corresponding terminals connected to one motor terminal, a source of direct-current energy having its terminals connected respectively to the one terminal of the generator and to the one terminal of the motor, said generator and motor being substantially alike in design and size so as to have substantially like mechanical and electrical characteristics.

5. In a variable speed drive, in combination, a dynamo-electric machine comprising a generator of the series type, mechanically coupled motor means to drive the generator to thus generate electric energy, adjustable impedance means connected in parallel relation to the field of the generator to thus vary the voltage of the energy generated by said generator, a second dynamo-electric machine comprising a motor of the series type electrically connected to the generator to be thus electrically driven at variable speed by said generator, the motor speed being a function of the adjustment of the adjustable impedance means for the generator field winding, and a source of direct-current energy connected across the field windings and impedance means to provide supplemental excitation to the field windings of said dynamo-electric machines.

6. In a variable speed drive, in combination, a dynamo-electric machine comprising a generator of the series type mechanically coupled motor means to drive the generator to thus generate electric energy, adjustable impedance means connected in parallel relation to the field of the generator to thus vary the voltage of the energy generated by said generator, a second dynamo-electric machine comprising a motor of the series type electrically connected to the generator to be thus electrically driven at variable speed by said generator, the motor speed being a function of the adjustment of the adjustable impedance means for the generator field winding, an adjustable impedance for the field winding of the motor to effect further speed adjustment of the motor, and a source of direct-current energy connected across the field windings and impedance means to provide supplemental excitation to the field windings of said dynamo-electric machines.

7. In a variable speed drive, in combination, a generator of the series type coupled to motor means to be driven thereby, a motor of the series type connected in a loop circuit with said generator, the field windings of the motor and generator being connected in series between corresponding armature terminals of the generator and the motor, means for varying the excitation of the generator field winding, transformer means comprising a primary and secondary energized from a suitable source of alternating current, current rectifying means connected to the secondary and having its direct-current terminals connected across the field windings of the generator and motor in the same polarity sense as the polarity sense of the load current flowing in the field windings whereby said rectifying means provide auxiliary excitation for the generator and motor field windings.

8. In a variable speed drive, in combination a generator of the series type coupled to motor means to be driven thereby, a motor of the series type connected in a loop circuit with said generator, an electric valve, the field windings of the generator, said electric valve and the field of the motor being connected directly in series, means for varying the excitation of the generator field winding, means for varying the excitation of the motor series field winding, transformer means comprising a primary and secondary energized from a suitable source of alternating current, current rectifying means connected to the secondary and having its direct-current terminals connected across the field windings of the generator and motor in the same polarity sense as the polarity sense of the load current flowing in the field windings and electric valve whereby said rectifying means provide auxiliary excitation for the generator and motor field windings.

9. In a variable speed drive, in combination, a generator of the series type coupled to motor means to be driven thereby, a motor of the series type connected in a loop circuit with said generator, the field windings of the motor and generator being connected directly in series, means for varying the excitation of the generator field winding, transformer means comprising a primary and secondary energized from a suitable source of alternating current, a full-wave rectifier having its alternating current terminals connected to the secondary, the direct-current terminals of the rectifier being connected across the field windings of the generator and motor in the same polarity sense as the polarity sense of the load current for energizing the field windings whereby said full-wave rectifier provides auxiliary excitation for said field windings.

10. In a variable speed drive, in combination, a generator of the series type coupled to motor means to be driven thereby, a motor of the series type connected in a loop circuit with said generator, an electric valve, said electric valve, the field windings of the generator and field winding of the motor being connected directly in series, means for varying the excitation of the generator field winding, means for varying the excitation of the motor field winding, transformer means comprising a primary and secondary energized from a suitable source of alternating current, a full-wave rectifier having its alternating-current terminals connected to the secondary, the direct-current terminals of the rectifier being connected across the field windings of the generator, the electric valve and the field winding of the motor in the same polarity sense as the polarity sense of the load current for energizing the field windings whereby said full-wave rectifier provides auxiliary excitation for said field windings.

11. In a variable speed drive, in combination, a generator mechanically coupled to suitable motor means to be driven thereby, said generator having an exciting circuit comprising a series field winding and an adjustable impedance connected in parallel thereto for adjusting the excitation of the generator a motor of the series type connected in a loop circuit with said generator, said motor having an exciting circuit comprising a field winding and an adjustable impedance connected in parallel thereto for adjusting the excitation of the motor, an auxiliary source of direct-current excitation for the motor and the generator comprising a transformer primary winding connected to a suitable source of alternating current, a secondary winding, and current rectifying means connected to the secondary winding and so connected across said two excitation circuits that the positive terminal of the rectifying means is connected to the positive terminal of the generator excitation circuit and the negative terminal is connected to the negative terminal of the motor excitation circuit.

12. In a variable speed drive, in combination, a generator of the series type, a motor of the series type, connected in a loop circuit with the generator, a source of alternating current, a full-wave rectifier connected to the source of alternating current, the positive and negative terminals of the rectifier being connected, respectively, to the positive and negative terminals of the fields of the generator and motor, and means for varying the excitation of the generator field.

13. In a variable speed drive, in combination, a generator of the series type, a motor of the series type, connected in a loop circuit with the generator, a source of alternating current, a full-wave rectifier connected to the source of alternating current, the positive and negative terminals of the rectifier being connected, respectively, to the positive and negative terminals of the fields of the generator and motor, an electric valve so connected in series with the field windings that current may flow only from the positive terminal of the generator field toward the negative terminal of the motor field, and means for varying the excitation of the generator field.

14. In a variable speed drive, in combination, a series generator of the series type, a motor of the series type, connected in a loop circuit with the generator, a source of alternating current, a full-wave rectifier connected to the source of alternating current, the positive and negative terminals of the rectifier being connected, respectively, to the positive and negative terminals of the field of the generator and motor, an electric valve so connected in series with the field windings that current may flow only from the positive terminal of the generator field toward the negative terminal of the motor field, and means for varying the excitation of the generator field, and the motor field.

WILLIAM R. HARDING.
RAYMOND W. MOORE.

REFERENCES CITED

The following references are of record in the file of this patent:

UNITED STATES PATENTS

| Number | Name | Date |
|---|---|---|
| 516,804 | Fiske | Mar. 20, 1894 |
| 2,315,511 | Elberty | Apr. 6, 1943 |
| 2,363,321 | Harding et al. | Nov. 21, 1944 |